(12) United States Patent
Cahill et al.

(10) Patent No.: US 7,024,054 B2
(45) Date of Patent: Apr. 4, 2006

(54) METHOD AND SYSTEM FOR GENERATING A FOREGROUND MASK FOR A COMPOSITE IMAGE

(75) Inventors: Nathan D. Cahill, West Henrietta, NY (US); Kenneth A. Parulski, Rochester, NY (US); Jiebo Luo, Pittsford, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 707 days.

(21) Appl. No.: 10/256,900

(22) Filed: Sep. 27, 2002

(65) Prior Publication Data

US 2004/0062439 A1  Apr. 1, 2004

(51) Int. Cl.
*G06K 9/36* (2006.01)
(52) U.S. Cl. ............... 382/294; 382/103; 348/564; 348/586; 345/589
(58) Field of Classification Search ............... 382/103, 382/218, 173, 162, 145, 209, 260, 262, 154, 382/132, 180, 294; 348/239, 564, 231.99, 348/854, 586, 587; 345/419, 589, 634, 590, 345/592; 375/240.12; 359/743
See application file for complete search history.

(56) References Cited

U.S. PATENT DOCUMENTS

| | | | | |
|---|---|---|---|---|
| 5,138,460 A | | 8/1992 | Egawa | .................. 358/224 |
| 5,262,856 A | | 11/1993 | Lippman et al. | ............ 358/136 |
| 5,424,781 A | | 6/1995 | Vlahos | ........................ 348/587 |
| 5,812,787 A | | 9/1998 | Astle | .......................... 395/200.77 |
| 5,914,748 A | * | 6/1999 | Parulski et al. | ............. 348/239 |
| 6,298,144 B1 | * | 10/2001 | Pucker et al. | ................ 382/103 |
| 6,301,382 B1 | | 10/2001 | Smith et al. | ................. 382/162 |
| 6,366,316 B1 | | 4/2002 | Parulski et al. | ............. 348/239 |
| 6,377,269 B1 | | 4/2002 | Kay et al. | .................... 345/589 |
| 6,515,704 B1 | * | 2/2003 | Sato | ...................... 348/333.11 |
| 6,556,704 B1 | * | 4/2003 | Chen | ......................... 382/154 |
| 2002/0018589 A1 | | 2/2002 | Beuker et al. | .............. 382/132 |
| 2003/0048949 A1 | * | 3/2003 | Bern et al. | ................... 382/218 |
| 2003/0076435 A1 | * | 4/2003 | Sato | ....................... 348/333.11 |

FOREIGN PATENT DOCUMENTS

WO   WO 98/25402   6/1998

OTHER PUBLICATIONS

U.S. App. No. 09/382,451, filed Aug. 25, 1999, Shoupu Chen.

(Continued)

*Primary Examiner*—Sanjiv Shah
*Assistant Examiner*—Ali Bayat
(74) *Attorney, Agent, or Firm*—David M. Woods

(57) ABSTRACT

A technique for producing a foreground mask from a digital image is based on receiving two digital images, wherein a first digital image is derived from a first original scene image including a foreground photographed against a background having arbitrary and unknown content matter, and a second digital image is derived from a second original scene image including substantially the same background but without the foreground. The second digital image is automatically aligned to the first digital image without user intervention to generate an aligned digital image including the background without the foreground. Then, using the first digital image and the aligned digital image, a foreground mask is produced relating to the spatial regions in the first digital image pertaining to the foreground, whereby the foreground mask is subsequently used to generate a composite digital image.

21 Claims, 10 Drawing Sheets

OTHER PUBLICATIONS

"A Robust Technique for Matching Two Uncalibrated Images Through the Recovery of the Unknown Epipolar Geometry" by Zhengyou Zhang, Rachid Deriche, Olivier Faugeras, Quang-Tuan Luong. INRIA Research Report No. 2273, May 1994, pp. 8-9.

"Stabilizing Image Mosaicing Model Selection" by Y. Kanazawa and K. Kanatani. *SMILE 2000 LNCS 2018*, 2001, pp. 35-51.

"The Phase Correlation Image Alignment Method" by C.D. Kuglin and D. C.Hines. *Proc. 1975 International Conference on Cybernetics and Society*, pp. 163-165, 1975.

R. Gonzalez and R. Woods, *Digital Image Processing*, Addison-Wesley, 1992.

R. Hartley and A. Zisserman, Multiple View in Geometry in Computer Vision, Cambridge University Press, 2000.

* cited by examiner

METHOD AND SYSTEM FOR GENERATING A FOREGROUND MASK FOR A COMPOSITE IMAGE

FIELD OF THE INVENTION

The invention relates generally to the field of digital image processing, and in particular to the manipulation of multiple images in an electronic imaging system. More specifically, the invention relates to a compositing technique for generating a foreground mask for inserting a foreground, such as a subject, into a different background or a rendered version of the existing background.

BACKGROUND OF THE INVENTION

Conventional methods and systems of generating composite images allow a user to extract people or objects from a scene, and composite them in front of a different, "fun" background, such as a Las Vegas skyline or an image of the moon. In the past, four methods have been used to accomplish this result: (1) A special uniformly colored screen or bright background is used behind the people/objects of interest, and a foreground mask is created using a "linear blue screen" method or "chroma key" method. An example of this method is described in U.S. Pat. No. 5,424,781, which is entitled "Backing Color and Luminance Nonuniformity Compensation for Linear Image Compositing". This method can give excellent results, but requires that the user have an expensive, carefully lit, colored background. (2) The people/objects of interest may be captured in front of any type of background, and then "cut" out of the background electronically using software tools available in such software packages as Adobe Photoshop™ version 6.0, for example. Unfortunately, for most subjects such as people, use of such software tools is a time-consuming and difficult process that typically yields a less than realistic looking border around the image. (3) The people/objects of interest may be captured in front of any type of background, and then the people/objects of interest are removed and the background itself is captured in a second image. An example of this method is found in commonly-assigned U.S. Pat. No. 5,914,748, which is entitled "Method and Apparatus for Generating a Composite Image Using the Difference of Two Images", where the two images are subtracted to form a difference image, and the difference image is digitally processed to form a mask image. The mask image is used to extract the people/objects of interest. Unfortunately, even though this method is superior to both of the other methods, it requires that the camera be firmly mounted on a tripod, or otherwise stabilized by a stationary object. (4) The people/objects of interests are separable from the background according to the difference in depth as captured by a companion depth map. As disclosed in commonly assigned U.S. patent application Ser. No. 09/382,451, which is entitled "Method for Forming a Depth Image from Digital Image Data," and was filed Aug. 25, 1999, a plurality of images associated with the same scene are captured to produce a depth map of the scene, making it possible to distinguish foreground subjects from the background for extracting the foreground subject that is to be inserted into other images.

In another method of extracting objects of interest from an image found in U.S. Pat. No. 6,377,269, which is entitled "Automated Generation of Masks for Photo-Compositing", an algorithm relies on two images which represent the same foreground against different backgrounds. This method does not require that the camera be firmly mounted on a tripod, or otherwise stabilized by a stationary object. However, if there is mis-registration between the two supplied images, edge detail may be lost. Thus this method includes a step of registering the images in order to remove errors caused by slight camera movement between image captures or from misalignment during scanning for images photographed with film. However, the disclosed alignment tool, which provides semi-automated and manual sub-pixel alignment of the images in both translation and rotation, would require knowledge and effort from the user in order to align the images. Furthermore, their method relies on single-color backgrounds, which prohibits it from being practiced with ordinary consumer images that contain backgrounds with arbitrary and unknown content.

An automatic technique such as phase correlation (see C. Kuglin and D. Hines, "The Phase Correlation Image Alignment Method", *Proc.* 1975 *International Conference on Cybernetics and Society*, pp. 163–165, 1975) could be used to automatically register images prior to subject extraction. Phase correlation only relies on the phase content of images to be registered, and not on the color or intensity content; therefore, phase correlation would be amenable to registering two images containing common subjects, but differently colored solid backgrounds, since the phase content of the backgrounds does not differ. However, this technique would not be amenable to extracting a subject from two images, one containing the subject plus background, and the second containing background only, when the images are ordinary consumer images whose backgrounds contain arbitrary and unknown content. In these circumstances, the phase content of the first and second images differ, making automatic registration a much more difficult problem.

U.S. Pat. No. 6,301,382, which is entitled "Extracting a Matte of a Foreground Object from Multiple Backgrounds by Triangulation", describes a method for extracting a matte of a foreground object from a composite image, using a computer. An image of the foreground object is recorded over at least two backgrounds having arbitrarily different coloring. Even though a registration step is included in certain embodiments of the method (e.g., see FIGS. 5 and 6 in the '382 patent), this registration step is used only to remove alignment errors introduced by misalignment of film in the camera as subsequent images are captured, or by misalignment of film in a scanner. The patent states explicitly (column 16, lines 1–2) that a remote-controlled shutter is used to guard against slight camera movements. This indicates that the camera is somehow stabilized during image capture, requiring the need for a tripod or other stabilization mechanism. Thus this patent fails to suggest any method for matte extraction that contains a registration step capable of automatically aligning images captured in the midst of any camera movement. Moreover each point of one background must have a color that is different than the color of a corresponding point in the other backgrounds, which prohibits it from being practiced with ordinary consumer images that contain backgrounds with arbitrary and unknown, but nonetheless similar, content.

U.S. Pat. No. 5,262,856, which is entitled "Video Image Compositing Techniques", describes a method for aligning images from a sequence of video frames, where the method includes aligning the backgrounds of images that contain moving subjects in order to produce an image sequence pertaining to a wider aspect ratio. This technique is capable of automatically aligning images with a common background and moving subjects without requiring a tripod or other stabilization means. However, the method is only reliable when the camera view does not change drastically over the course of the image sequence. The method relies on a motion estimation technique for alignment, which assumes that any misalignment between subsequent images can be described locally. This constrains subsequent images to be captured from roughly the same view point. Furthermore, the patent suggests a spherical or cylindrical projection of the wide aspect ratio image in order to combine elements from different frames with effectively little or no distortion. Spherical and cylindrical projection both implicitly assume that the viewpoint of the camera remains the same in subsequent images, and that any motion is due to a rotation of the camera about its nodal point. Therefore, this method is not amenable to extracting the subject of an image given multiple images that are captured from different viewpoints.

What is required is a method of extracting people/objects of interest from images containing arbitrary and unknown backgrounds that can quickly and easily be accomplished by inexperienced users, and that gives acceptable results, without requiring a special colored background, or the stabilization of the camera by a tripod or other stationary object, and that is robust under fairly large camera motion.

SUMMARY OF THE INVENTION

The present invention is directed to overcoming one or more of the problems set forth above. Briefly summarized, according to one aspect of the present invention, a method for producing a foreground mask from a digital image comprises the steps of: (a) receiving two digital images, each having a plurality of pixels, wherein a first digital image is derived from a first original scene image including a foreground photographed against a background having arbitrary and unknown content matter, and a second digital image is derived from a second original scene image including substantially the same background but without the foreground; (b) automatically aligning the second digital image to the first digital image to generate an aligned digital image including the background without the foreground, wherein the automatic aligning is achieved without user intervention; and (c) using the first digital image and the aligned digital image to produce a foreground mask relating to the spatial regions in the first digital image pertaining to the foreground, whereby the foreground mask is subsequently used to generate a composite digital image.

In a further aspect of the invention, the step of receiving the two digital images comprises (a) initiating a composite image capture process in a digital camera by capturing and storing the first digital image and displaying a portion of the first digital image that is to overlap with the second digital image; and (b) displaying a live image in an overlapping relationship with the first digital image to enable a user to coarsely align the live image with the first digital image before capturing the live image as the second digital image.

In yet another aspect, the invention comprises a system for producing a foreground mask from a digital image, including a digital camera for capturing two digital images, each having a plurality of pixels, wherein a first digital image is obtained from a first original scene image including a foreground photographed against a background having arbitrary and unknown content matter, and a second digital image is obtained from a second original scene image including substantially the same background but without the foreground; and a processor for (a) automatically aligning the second digital image to the first digital image to generate an aligned digital image including the background without the foreground, wherein the automatic aligning is achieved without user intervention; and (b) using the first digital image and the aligned digital image to produce a foreground mask relating to the spatial regions in the first digital image pertaining to the foreground, whereby the foreground mask is subsequently used to generate a composite digital image.

In still another aspect, the invention embodies a digital camera for capturing a sequence of images that are subsequently useful in a compositing process. Such a camera includes an imaging device for capturing image data; a memory for storing the image data from the imaging device; a digital processing section coupled to the imaging device and the memory to enable the capture and storage of a first digital image including a subject photographed against a background; and an electronic view finder coupled to the digital processing section for displaying a portion of the first digital image including the subject in a first display zone. The digital processing section further enables the capture and display on the view finder of a second digital image including substantially the same background without the subject in an overlapping relationship with the displayed portion of the first digital image, whereby the second digital image is displayed as a live image in a second display zone on the viewfinder to enable a user to coarsely align the live image with the first digital image before capturing the live image as the second digital image, ensuring that the two images are captured from substantially the same viewpoint.

By taking a first picture of people and/or objects in front of any type of background (rather than using a specially colored background), followed by a second picture after the people/objects are removed, and furthermore by automatically aligning the first and second pictures, a system is obtained which provides quick and easy results, even by inexperienced users, and does not require that the camera be mounted on a tripod or otherwise stabilized by a stationary object. The aligned digital image is subtracted from the first image, and the result is automatically processed in order to create a foreground "mask" that is used to extract just the people/objects, which can then be composited into any desired background.

These and other aspects, objects, features and advantages of the present invention will be more clearly understood and appreciated from a review of the following detailed description of the preferred embodiments and appended claims, and by reference to the accompanying drawings.

ADVANTAGES

The present invention has the advantage of not requiring a special colored background, and of not requiring the stabilization of the camera by a tripod or other stationary object, and of being robust to large camera motion, thereby enabling the invention to be easily accomplished by an inexperienced user with a handheld camera.

DETAILED DESCRIPTION OF THE INVENTION

Because imaging systems employing electronic sensors and host computers are well known, the present description will be directed in particular to elements forming part of, or cooperating more directly with, method and system in accordance with the present invention. System and method elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 1:
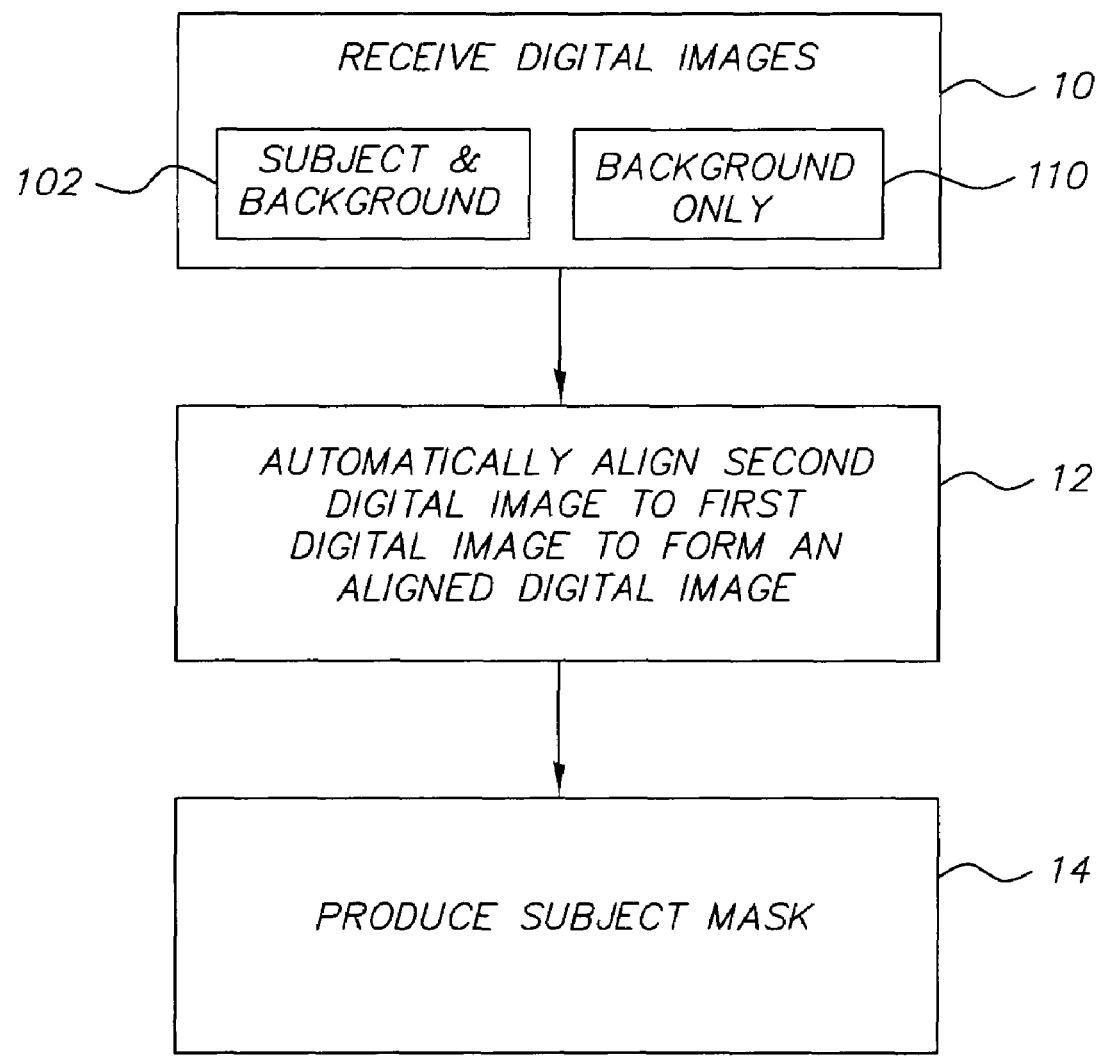
FIG. 1 is a block diagram of the method of producing a subject mask according to the invention.

A diagram of the process of producing a subject mask according to the present invention is shown in FIG. 1. First, a first digital image 102 of a subject plus background and a second digital image 110 of substantially the same background only are received, as indicated by a receiving stage 10. The digital images may be produced directly from a digital camera (motion or still), scanned from film exposed by a photographic camera, input from a database of suitable images, or otherwise obtained from like sources (including network-based sources, such as the Internet). In the preferred embodiments, the images are obtained from a digital camera. Wherever obtained, the images share the characteristic of a subject photographed against a common, or at least substantially common, background having arbitrary and unknown content matter such as would be found, e.g., in ordinary consumer images. After the digital images are received in the receiving stage 10, the second digital image 110 is automatically aligned (i.e. without user intervention) to the first digital image 102 to form an aligned digital image, as indicated by an aligning stage 12, where the aligned digital image is an aligned representation of the background only. Finally, the first digital image 102 and the aligned digital image are used to produce a subject mask, as indicated by a mask production stage 14. Embodiments of the receiving stage 10 are further described in reference to FIGS. 2, 3A, 3B, 7A, 7B and 9. A preferred embodiment of the aligning stage 12 is further described in reference to FIG. 4. Embodiments of the mask production stage 14 are further described in reference to FIGS. 5, 6, 8A and 8B.

Figure 2:
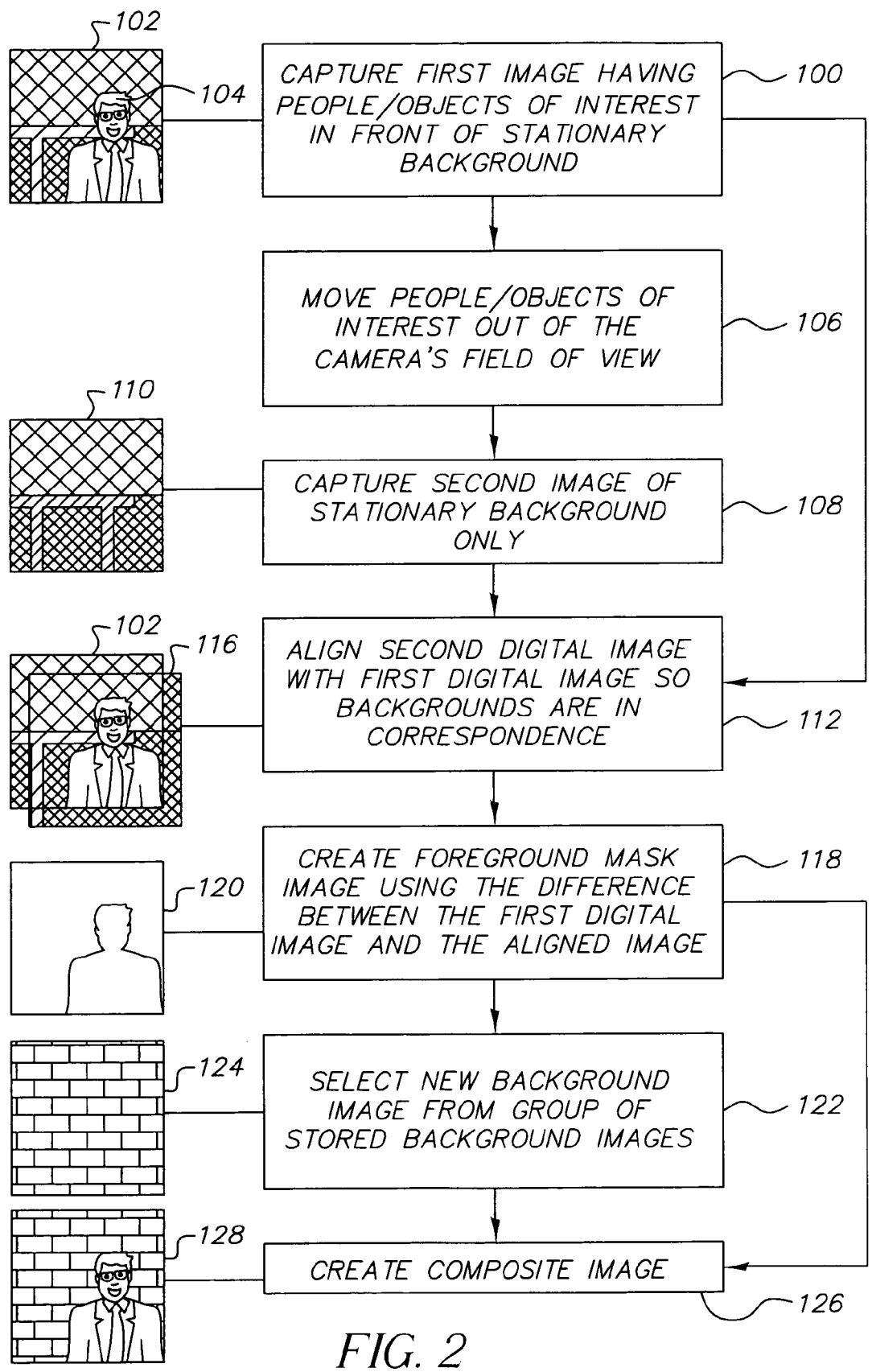
FIG. 2 is a diagram of a system for generating a composite image according to the invention.
Figure 7A:
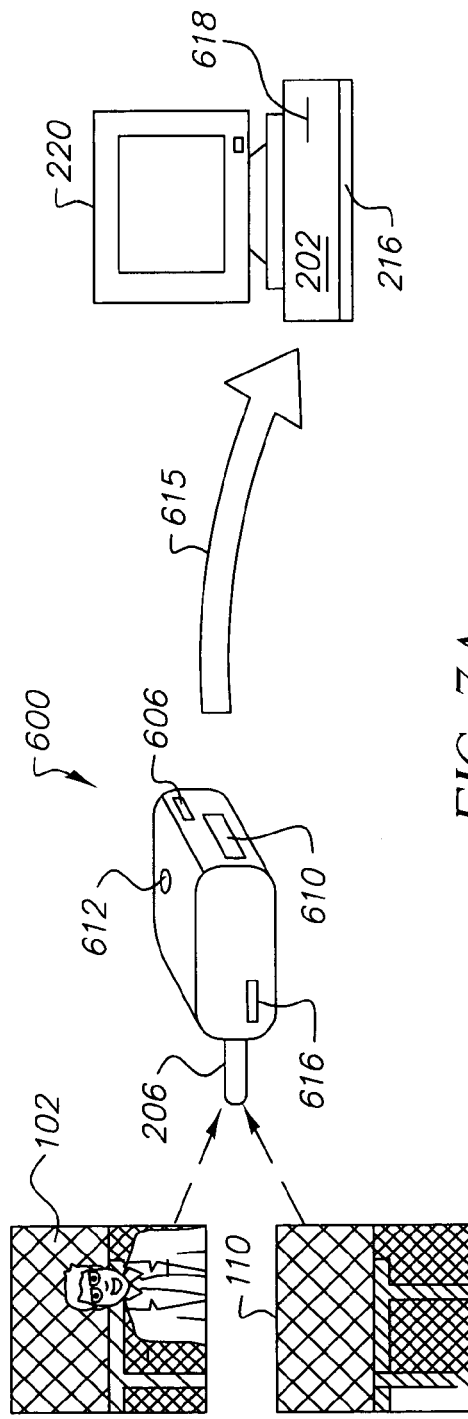
FIGS. 7A and 7B show a portable digital camera with removable memory and a block diagram of a camera circuit for the portable digital camera, both useful with the system of FIG. 2.

A diagram of the process of generating a composite image according to the present invention is shown in FIG. 2. With the camera controlled by the user, a first digital image 102 of a subject 104 plus background is captured (capture step 100). The subject is moved out of the field of view of the camera (subject removal step 106) and a second digital image 110 of the background only is captured (capture step 108). The second digital image is aligned with the first digital image (alignment step 112) to form an aligned digital image 116. (A preferred technique for the alignment step 112 will be described in connection with FIG. 4). A foreground mask 120 is generated in a foreground mask generation step 118 based on a difference image produced as the difference between the first digital image 102 and the aligned digital image 116. In the preferred embodiment, the foreground mask 120 isolates a subject, which may include one or more people and/or objects, and is therefore sometimes referred to as a subject mask. The foreground mask 120 is used to extract a foreground image 104 by applying the foreground mask 120 to the first digital image 102 in a compositing step 126, wherein a new background 124 selected from a group of stored background images (in a background selection step 122) is combined with the extracted foreground image 104 to provide a composite image 128 with the new background image. (A preferred technique for the foreground mask generation step 118 will be described in connection with FIG. 5). The techniques for the alignment step 112 and foreground mask generation step 118 is preferably implemented either with a tethered digital camera 200 as shown in FIG. 3A, or with a portable digital camera 600 incorporating a removable memory, as shown in FIG. 7A.

In compositing step 126, a composited image 128 is produced by combining the foreground image 104 with the selected background image. The pixels of the composited image 128 are taken from the background image when the pixel value of the foreground image 104 is zero. Conversely, when the pixel value of the foreground image 104 is not zero, the pixel of the composited image 128 is taken from the foreground image 104. For border pixels, i.e. pixels of the foreground image 128 that are adjacent to pixels that have a value of zero, the pixel value of the composite image 128 can be calculated as a combination of the foreground image 104 pixel value and the background image pixel value. This process of combining pixel values for border pixels produces a more natural integration of the image content from the foreground image 104 with the image content from the background image.

In particular, the combination of the two pixel values for border pixels can be performed with the pixel data in a linear code value domain, that is, if the pixels of the foreground image 104 and the background image have a linear relationship with the intensity of light received from which the pixel values are derived. The two pixel values to be combined are transformed with a first look-up-table that that converts pixel values into a linear code value domain. The transformed pixel values are then combined linearly, preferably with equal weighting, to produced a linear code value domain combined pixel value. The linear code value domain combined pixel value is then transformed with a second look-up-table that is the inverse transform of the first look-up-table. The final pixel value is in the same code value domain as the original two pixel values and is used as the pixel value for the composite image 128.

Figure 3A:
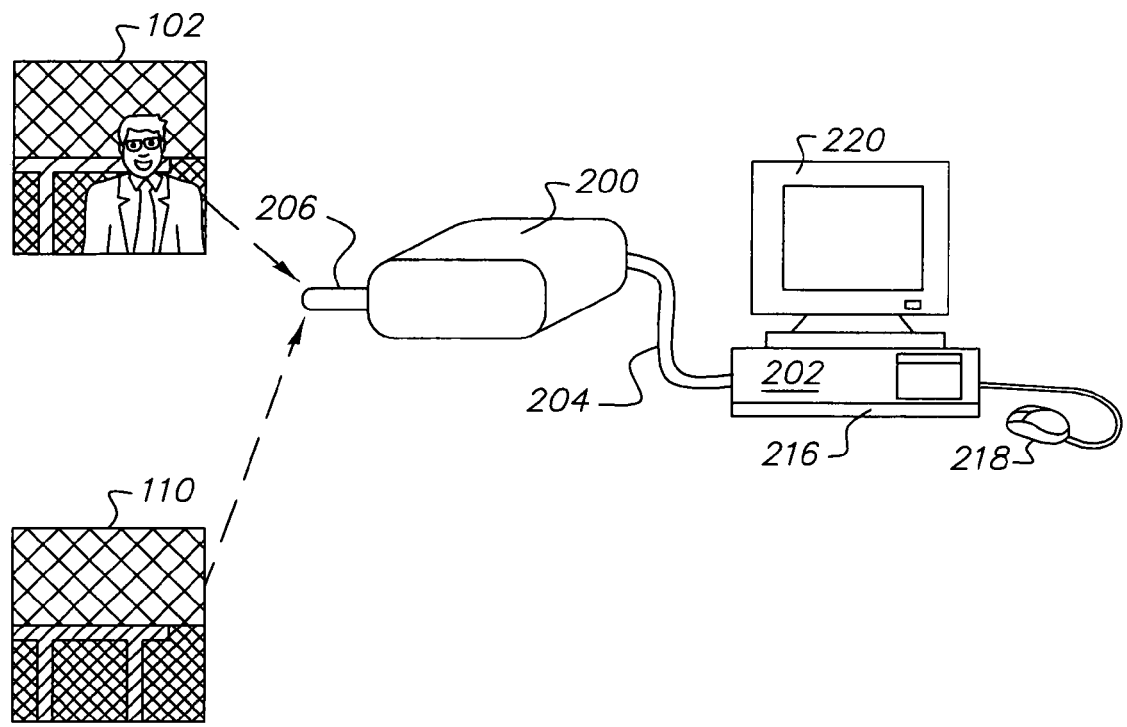
FIGS. 3A and 3B show a digital camera tethered to a computer and a block diagram of a camera circuit for the tethered camera, both useful with the system of FIG. 2.
Figure 3B:
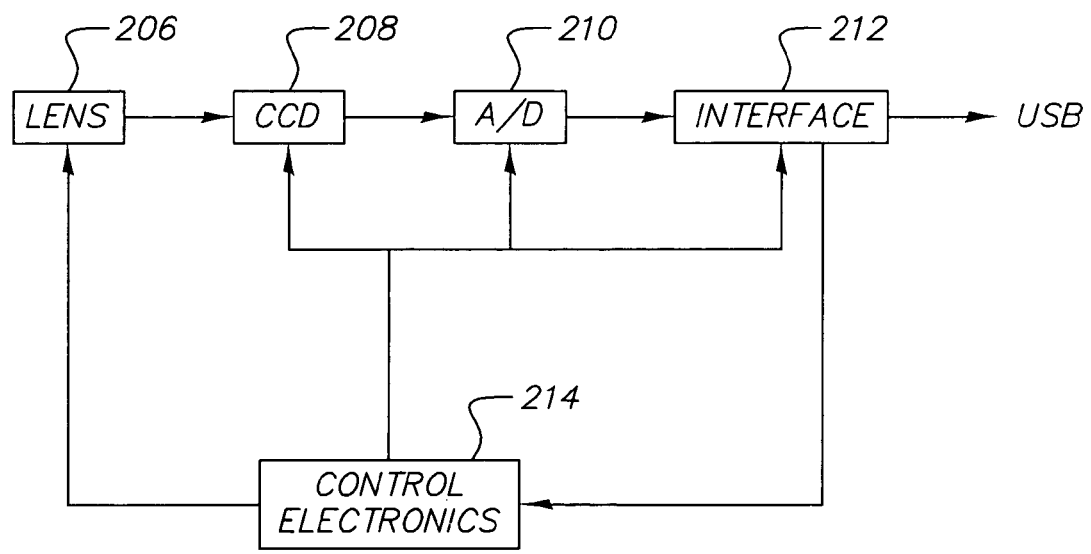

In FIG. 3A, the tethered camera 200 is connected to a host computer 202 via the interface cable 204, which may utilize a conventional "Universal Serial Bus" (USB) interface, for example. The camera is held in the hands of the user, and, as shown in FIG. 3B, includes a lens 206, a charge-coupled device (CCD) image sensor 208, an analog-to-digital (A/D) converter 210, an interface electronics section 212 to drive the USB interface, and a control electronics section 214 to drive the image sensor 208 and control the A/D 210 and the interface electronics section 212. The control electronics section 214 also controls the exposure settings of the camera, e.g., by controlling an aperture in the lens 206 and the electronic shuttering of the image sensor 208. Power is supplied to the camera 200 from the computer 202 via the USB cable 204. The user enables the compositing feature via a command from a keyboard 216 or a mouse 218. The computer 202 then commands the camera 200 to capture the first digital image 102, having a subject in front of any background. For best results, the background should be some distance behind the subject, so that the subject does not cast a deep shadow on the background. The subject and/or objects are then removed from the scene, and a second digital image 110 is taken, this time of only the background. The second digital image 110 may be taken automatically after some period of time (for example 10 seconds) or instead taken when the user provides another keyboard or mouse input command to the computer 202. The algorithm works best when the camera focus and exposure setting for the second exposure are the same as for the first exposure. This condition minimizes the difference of the image background between the two exposures. Although it is possible to have a different exposure setting for the second exposure and compensate for it, knowing the camera and system calibration, the procedure is simplified by keeping the exposure setting for the second exposure the same as the first. If the camera focus or exposure setting is not maintained, the change needs to be compensated before applying the following processing.

Figure 4:
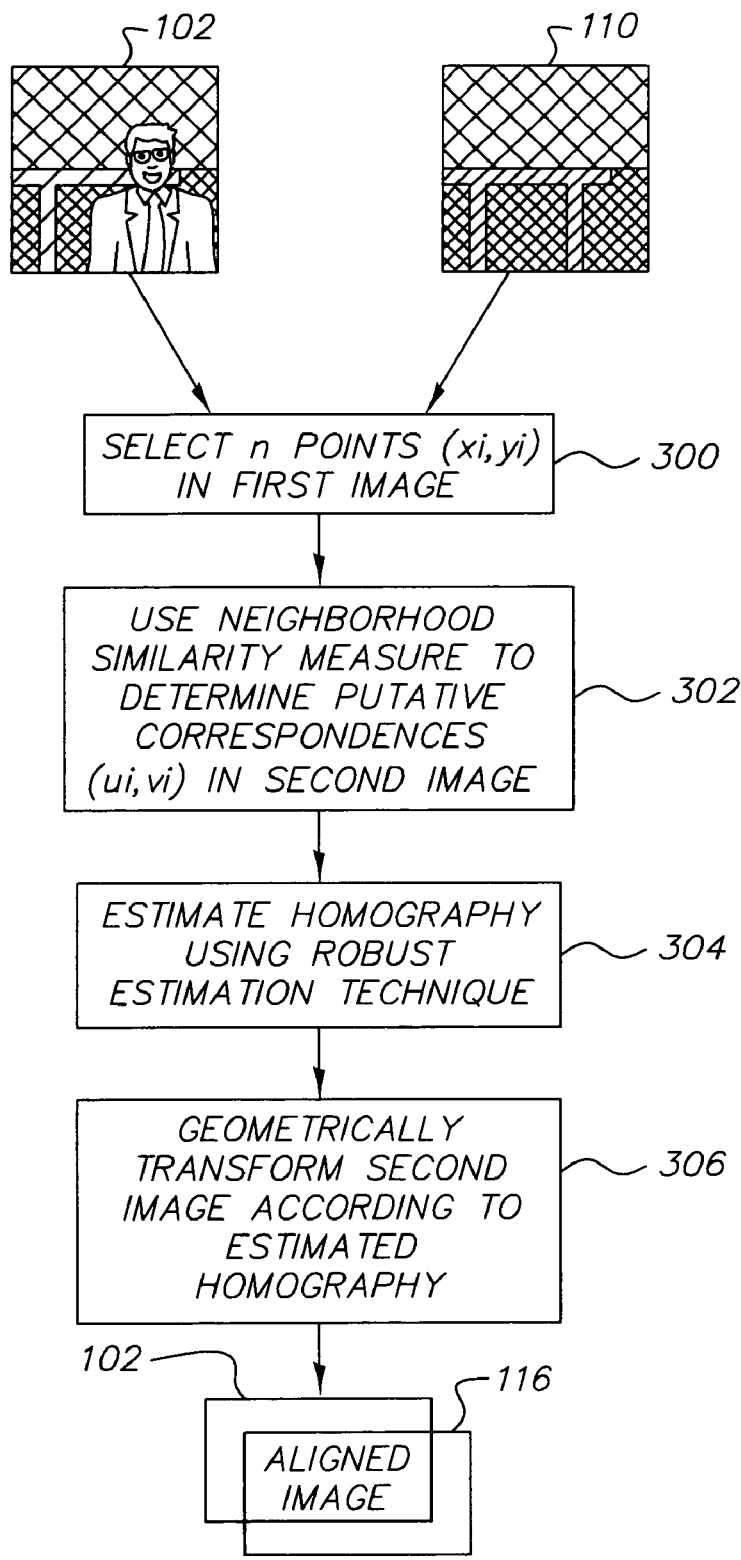
FIG. 4 shows a preferred technique for the alignment step shown in the diagram of FIG. 2.
Figure 5:
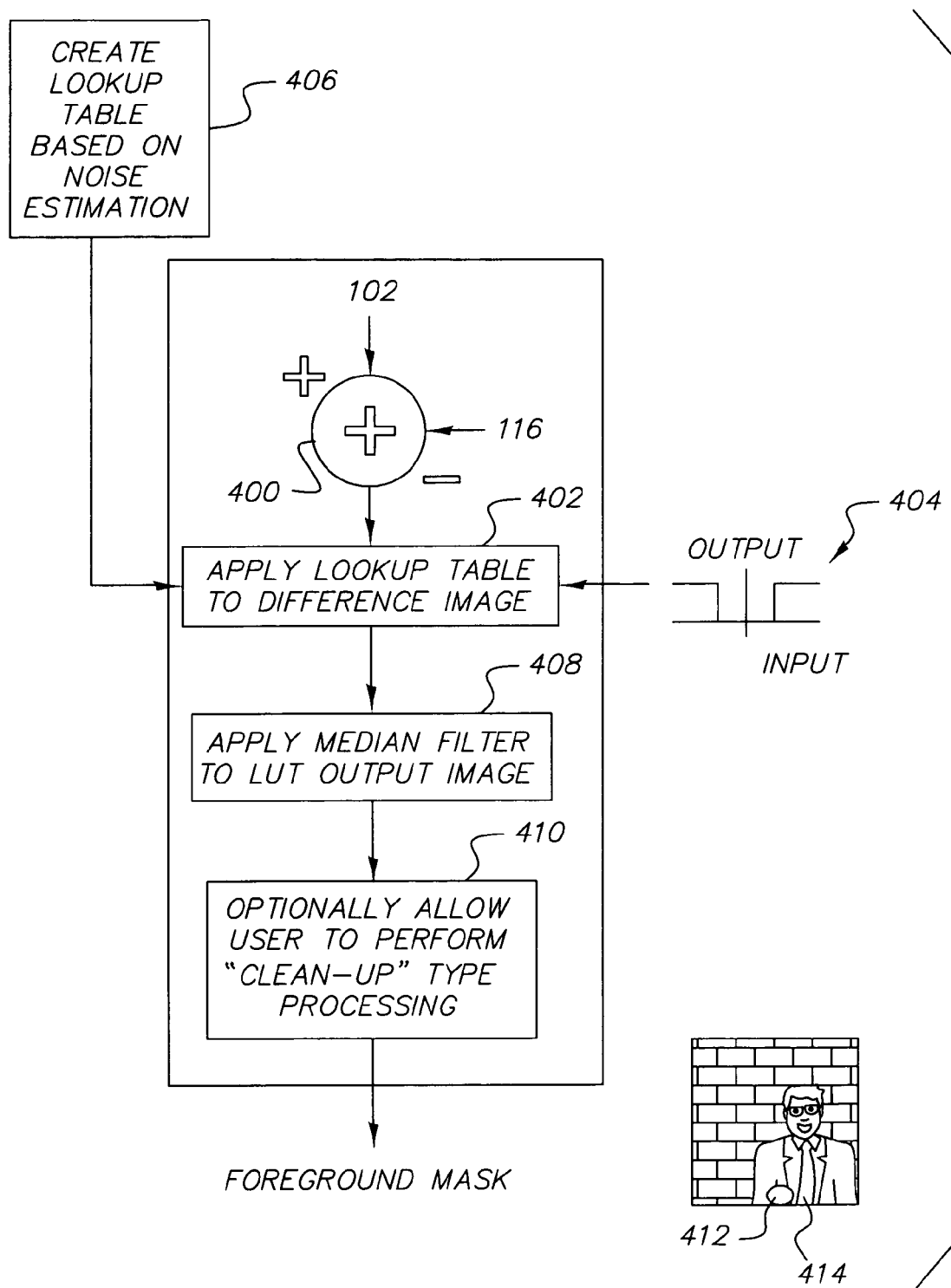
FIG. 5 shows a preferred technique known in the prior art for the foreground mask generation step shown in the diagram of FIG. 2.
Figure 6:
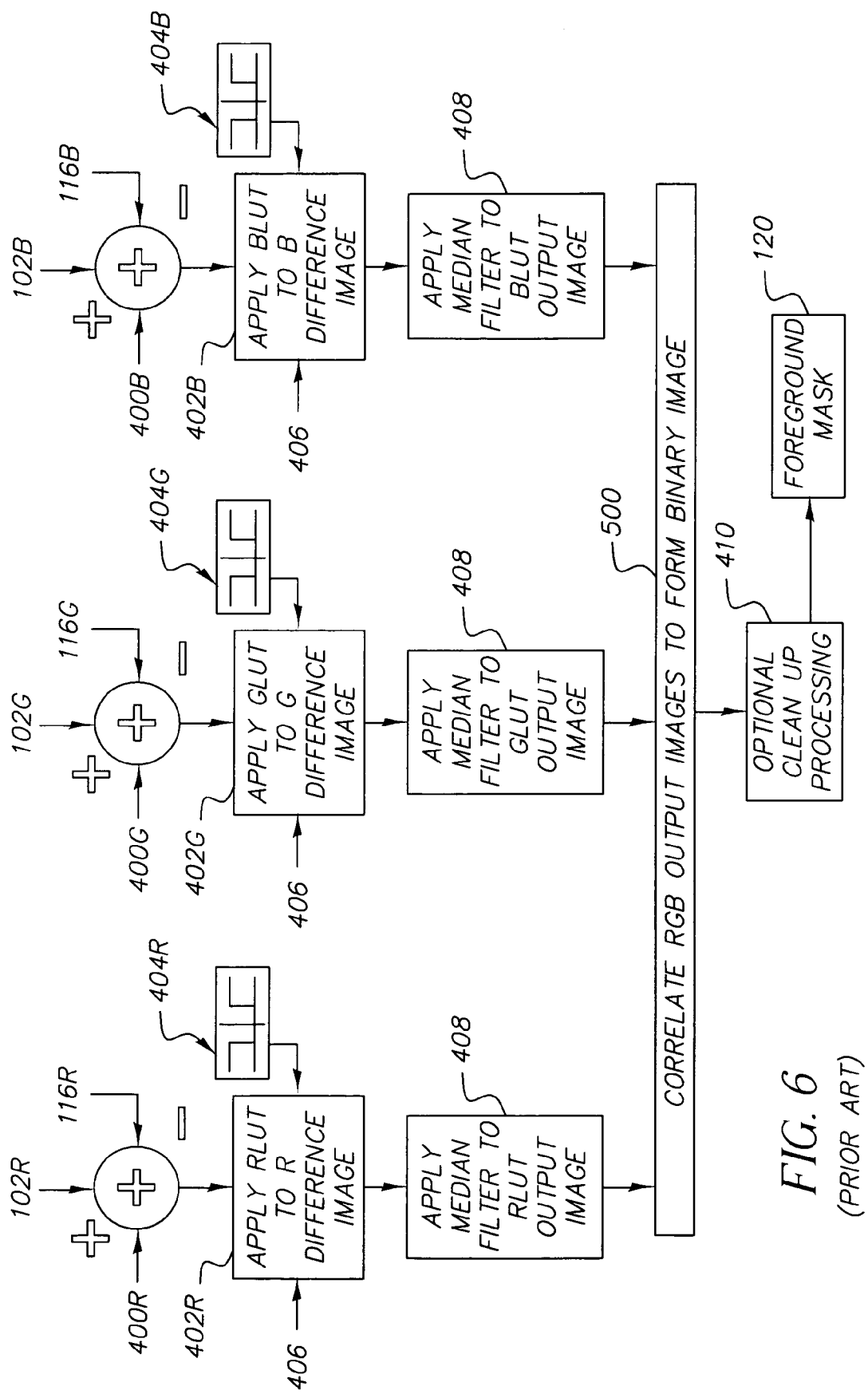
FIG. 6 shows a preferred technique known in the prior art for the foreground mask generation step shown in FIG. 5 specifically for color images.

The two images are then processed by the computer 202 as shown in FIGS. 4, 5 and 6 and the composite image is displayed on a monitor 220 (FIG. 3A) or produced on a printer (not shown). During the processing in the computer 202, the second digital image 110 is aligned with the first digital image 102, and then the aligned digital image 116 is subtracted from the first digital image 102 in order to generate a foreground mask image. A preferred embodiment of the alignment step 112 is illustrated in FIG. 4, and a preferred embodiment of the mask generation step 118 is illustrated in FIG. 5.

Referring now to FIG. 4, after the first 102 and second 110 digital images have been captured, the second digital image 110 is aligned with the first digital image 102 to form an aligned digital image 116 so that each pixel position (x, y) in the background of the aligned digital image 116 corresponds to the same scene point as the pixel position (x, y) in the first digital image 102. In this embodiment, the backgrounds of each image are considered to differ by an homography. An homography describes the relationship between two perspective images of a planar surface in the scene. Since the background information of an image is generally far away from the subject, the background can effectively be considered a planar surface. As long as the background is sufficiently far from the subject (for example, if the subject is 2 meters from the camera, and the background is 8 or more meters from the camera), an homography will be a suitable model. An homography will fail to be a suitable model in situations where there is a large difference in depth of the background relative to the depth of the subject from the camera, and relative to the motion of the camera. For example, if the subject is 2 meters from the camera, the background ranges from 20–25 meters from the camera, and the photographer moves one meter between subsequent captures, the homography model is suitable. However, if the subject is 2 meters from the camera, the background ranges from 3–20 meters from the camera, and the photographer moves one meter between subsequent captures, the homography model is likely unsuitable, because it will not account for visible background objects in one image that are occluded in the other.

In mathematical terms, if pixel $(x_i, y_1)$ in the background of the first digital image 102 corresponds to pixel $(u_1, v_i)$ in the second digital image 110, the homography relating the backgrounds is defined as the 3×3 matrix H satisfying:

$$\begin{pmatrix} x_i \\ y_i \\ 1 \end{pmatrix} = \begin{pmatrix} H_{1,1} & H_{1,2} & H_{1,3} \\ H_{2,1} & H_{2,2} & H_{2,3} \\ H_{3,1} & H_{3,2} & H_{3,3} \end{pmatrix} \begin{pmatrix} u_i \\ v_i \\ 1 \end{pmatrix}, \qquad \text{Eq. (1)}$$

where $(a, b, 1)^T$ is the homogeneous representation of pixel position (a, b). In the homogeneous representation, two vectors are considered identical if they differ by a nonzero scale factor, i.e., $(aw, bw, w)^T = (a, b, 1)^T$ if $w \neq 0$. Therefore, H is unique up to scale factor, and thus depends on eight parameters. If at least four correspondence points between the backgrounds of the two images are known, H can be determined by a variety of techniques, such as least squares, least median of squares, RANSAC, etc. (For further information about techniques for homography estimation generally, see R. Hartley and A. Zisserman, *Multiple View Geometry in Computer Vision*, Cambridge University Press, 2000, and more specifically pages 109–116 of Hartley and Zisserman for RANSAC, or Y. Kanazawa and K. Kanatani, "Stabilizing Image Mosaicing by Model Selection", SMILE 2000, LNCS 2018, 2001, pp. 35–51.) One way that correspondence points can be found is by displaying both the first and second digital images on the computer monitor 220 and having the user manually identify at least four correspondence points with the mouse 218. However, this method requires the user to intervene, and the compositing process is no longer automatic.

Another way to determine correspondence points is to automatically find an initial putative correspondence point set. The putative correspondences can then be used by a robust estimation technique, such as least median of squares or RANSAC to determine the homography. Since these homography estimation techniques are robust, they do not require the putative correspondences to be perfect. In fact, the aforementioned Hartley and Zisserman reference illustrates an example where the RANSAC technique successfully estimates the homography when the putative correspondence point set contains 262 mismatches out of an initial set of 268 putative correspondences. One method of automatically building a putative correspondence set is to choose a set of points in one image, and attempt to locate their corresponding points in the other image by using a similarity measure. For example, consider a collection of n points $(x_i, y_1)$, i=1, . . . , n in the first image. These points can be chosen by any number of methods. They could be chosen randomly from a uniform distribution over the image. In the preferred embodiment, they are selected (point selection step 300) as the n best features found by a corner detector (see, for example, Z. Zhang, R. Deriche, O. Faugeras, and Q. -T. Luong, "A Robust Technique for Matching Two Uncalibrated Images Through the Recovery of the Unknown Epipolar Geometry," *INRIA Research Report No. 2273*, May 1994, pp. 8–9), but they may be alternatively determined by any of a variety of techniques known to one of ordinary skill in this art. For each point $(x_i, y_i)$ in the collection, a matching point $(u_1, v_i)$ in the second image is selected in a neighborhood similarity measure step 302 if it has the best neighborhood similarity measure within a region centered on $(x_{i, y1})$. The similarity measure can be chosen to be the correlation coefficient, sum of squared intensity differences, sum of absolute deviations, or any of a variety of other similarity measures (see R. Gonzalez and R. Woods, *Digital Image Processing*, Addison-Wesley, 1992). In some cases, a unique matching point $(u_1, v_1)$ may not exist. In these cases, one of the multiple matching points may be chosen randomly. Alternatively, the point $(x_1, y_i)$ can be removed from the set of putative correspondences as long as at least four points remain in the set. In non-background areas (i.e. spatial regions) of the first digital image 102, any match to a point in the second digital image 110 determined by a similarity match will clearly be incorrect, because the second digital image 110 does not contain any non-background areas. This problem can be ignored because of the insensitivity of the robust estimation schemes to a large number of mismatches.

Once a set of putative correspondences has been established (step 302), a robust estimation technique can be used (homography estimation step 304) to estimate the homography between the background areas of the two images. A suitable estimation technique is the RANSAC technique described on p. 108 of the aforementioned Hartley and Zisserman reference. This technique yields an estimate $\hat{H}$ of the true homography H relating the backgrounds of the two images. The second digital image 110 is then geometrically transformed (geometric transformation step 306) according to the estimated homography to align it with the first digital image 102. Geometric transformations are described in detail in Section 5.9, pp. 296–302, of the aforementioned Gonzalez and Woods reference. In this specific case, the geometric transformation consists first of spatially transforming the second digital image 110 with coordinates (u,v) into the aligned digital image 116 with coordinates $(\hat{u}, \hat{v})$ by the following functions:

$$\hat{u} = \frac{\hat{H}_{1,1}u + \hat{H}_{1,2}v + \hat{H}_{1,3}}{\hat{H}_{3,1}u + \hat{H}_{3,2}v + \hat{H}_{3,3}}$$

$$\hat{v} = \frac{\hat{H}_{2,1}u + \hat{H}_{2,2}v + \hat{H}_{2,3}}{\hat{H}_{3,1}u + \hat{H}_{3,2}v + \hat{H}_{3,3}},$$

Eq. (2)

where $\hat{H}_{i,j}$ is the (i, j) entry of $\hat{H}$. Once the coordinates have been spatially transformed, each channel of the spatially transformed image is sampled on a regular grid of pixels by some type of gray-level interpolation, such as bilinear or bicubic interpolation, to form the aligned digital image 116. The aligned digital image 116 is now in alignment with the first digital image 102. As a byproduct of the geometric transformation, the borders of the first digital image 102 and aligned digital image 116 may not be the same. This can provide problems later in the compositing process. To avoid potential problems, the first digital image 102 can be cropped to a rectangular region whose border lies entirely within the aligned digital image 116. The aligned digital image can then be cropped to the same rectangular region, allowing subsequent image differencing to be well defined.

In alternative embodiments, transformations other than homographies can be used to represent the relationship between the backgrounds of images 102 and 110. For example, translational, rotational, rototranslational (rotation+translation), or affine transformations can be used. Each of these models can be considered as a subgroup of the homography group, and therefore can be estimated in a similar manner. (See the aforementioned Kanazawa and Kanatani reference for more details on estimating these types of transformations).

Referring now to FIG. 5, which is similar to FIG. 2 in the aforementioned U.S. Pat. No. 5,914,748, after the alignment step 112 has taken place, the aligned digital image 116 is subtracted from the first digital image 102 in a differencing section 400 in order to generate a foreground mask image. (For further information about related differencing techniques, see, e.g., a doctoral dissertation of Michael Kelly located in the Stanford University library (*Visual Identification of People by Computer*, by Michael D. Kelly, Stanford University (computer science), Ph.D. thesis, 1970). Because the background areas are substantially the same in both images, the result should be an image that is approximately 0 in background areas where the desired subject was not present. Because the subject area is only found in the first digital image 102, the result should be an image that is generally non-zero in subject areas where the subject was present. However, all pixels in the background areas will not be exactly 0, since there will be some level of noise in the camera. Moreover, for certain subjects and backgrounds, some pixels in the differenced "subject" area may be approximately zero, if the brightness and color of these pixels in the subject and background are nearly identical. Therefore, additional processing steps are used to create a suitable foreground mask image. In particular, a noise reduction algorithm is used to reduce noise in the difference image.

As shown in FIG. 5, the additional processing steps generally include (for a generic example) processing the difference image by a lookup table (LUT) 402 according to a table threshold as shown in a threshold diagram 404 in order to generate a binary mask image. (Furthermore, a threshold estimation 406 automatically sets the proper threshold by measuring the noise of the channel using the captured images.) The output of the LUT may be processed by using a median filter 408, for example, to eliminate random noise in the background and the foreground. Finally, the user may optionally "clean up" any obvious holes in the foreground mask where the image value of the subject matched that of the background immediately behind that area of the image. This "clean up" operation is preferably done in a user section 410 with a user-controlled tool 412 that "paints" over any of the new background 414 that occurs inside the subject, or old background that occurs outside the subject.

For color images, certain parts of the processing shown in FIG. 5 are performed separately for each R,G,B color layer (record) composing the images 102 and 116. As shown in FIG. 6 (which is similar to FIG. 5 in the aforementioned '748 patent), the additional processing steps include processing the R, G, and B difference images by separate RGB lookup tables (LUT) 402R, 402G, and 402B according to separate table thresholds as shown in the separate threshold diagrams 404R, 404G, and 404B. Note that the exact threshold is preferably set differently for the red, green, and blue channels, since the noise levels of the three channels may be different. (As already shown in FIG. 5, the threshold estimation 406 automatically sets the proper threshold; now, however, this is done for each color by measuring the noise of the three channels using the captured images.) The output of each LUT 402R, 402G, and 402B may be processed by separate median filters 408, for example, to eliminate random noise in the background. In a correlation section 500, the outputs of the median filters 408 are combined in an OR operation to form a single binary mask. In generating the binary image, if any of the three (RGB) color layers of the difference image are found to be significantly different from zero, the mask is set high (255), while if all three are nearly zero, the mask is set low (0). Finally, the user may optionally "clean up" any obvious holes in the foreground mask where the color of the subject matched that of the background immediately behind that area of the image. This "clean up" operation is preferably done in a user section 410 with a user-controlled tool 412 that "paints" over any of the new background 414 that occurs inside the subject.

Figure 7B:
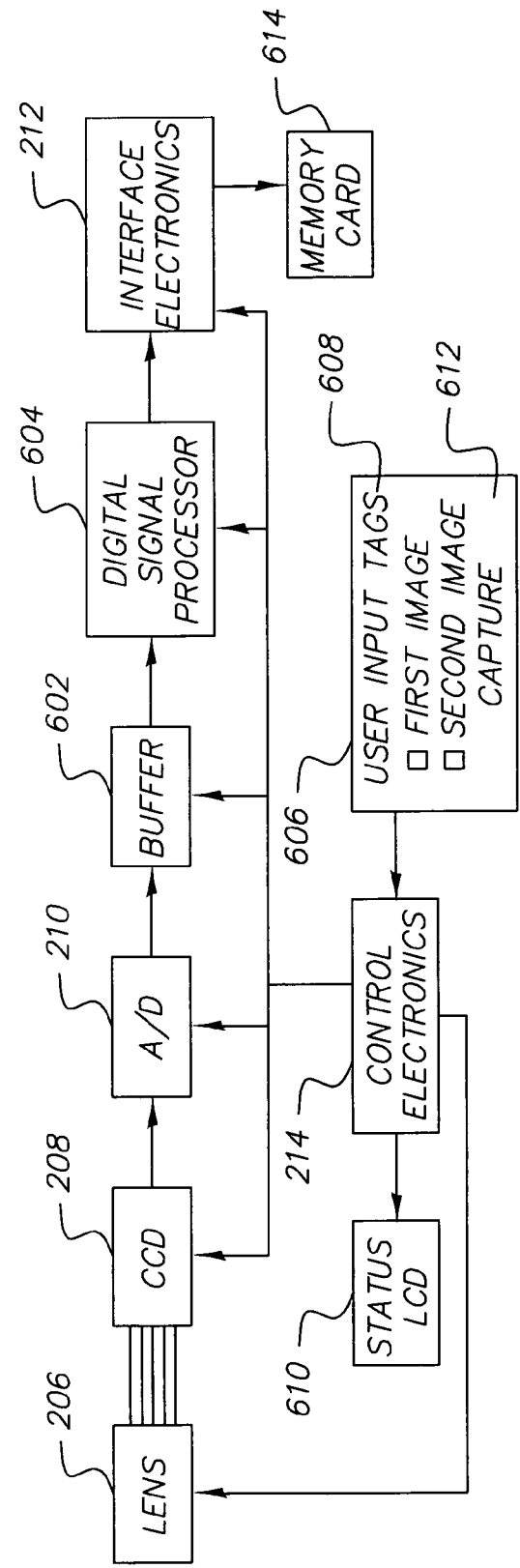

This invention can also be applied to a portable digital camera 600 with removable memory, as shown in FIGS. 7A and 7B, wherein elements already described in connection with FIG. 3A operate similarly and are given the same reference characters (albeit the interface electronics 212 is adapted to the particular storage interface used). The captured digital image is stored in a buffer memory 602 and then processed in a digital signal processor (DSP) 604, where information identifying the image can be attached to the image file. In particular, a user input control section 606 allows user input of tags that identify the captured image as either the first digital image 102 or the second digital image 110. The images may be taken by the camera 600 when the user has selected a compositing mode 608 on a status liquid crystal display (LCD) 610 by using the user input controls 606. The user then actuates a capture button 612, the camera 600 captures the selected picture, the DSP 604 appends the appropriate tags to the image files, and the image files (with tags) are stored in a removable memory card 614. The memory card 614 is then removed from a memory card slot 616 in the camera 600 and taken to the computer 202, as represented by the arrow 615. When the card is inserted into a complementary memory card slot 618 in the host computer 202, the images are read out by the computer 202, the tags are accessed to identify the images, and the rest of the steps described in FIGS. 2, 4, 5, and 6 are performed.

Alternatively, when the user has selected the compositing mode 608, the camera 600 may take the first digital image 102, e.g., ten seconds after the user presses the shutter button 612, and the second digital image 110, e.g., twenty seconds after the shutter button is pressed. The two images may then be automatically "tagged" by the DSP 604 as the first and second images of a composite set as the images are stored on the removable memory card 614 inserted into the memory card slot 616. Furthermore, the DSP 604 could be programmed to align the images in the camera 600 using the process outlined in FIG. 4, and the first digital image 102 and aligned digital image 116 could be stored (with associated tags indicating the first digital image and aligned digital image) on the removable memory card 614. Furthermore, the DSP 604 could be programmed to generate the foreground mask in the camera 600 using the process outlined in FIGS. 5 and 6, and the first digital image 102 and the foreground mask 120 could be stored (with associated tags indicating the first image and foreground mask) on the card, and later composited with a new background image on the host computer 202. In each implementation, the host computer 202 may store a library of background images for selection by the user (see step 122 in FIG. 2).

Alternatively, all of the steps of FIG. 2 could be performed in the camera 600 by enabling the user to select a preferred background image from a group of background images that could be supplied using the memory card 614, as described in commonly assigned U.S. Pat. No. 5,477,264, entitled "Electronic Imaging System Using a Removable Software-Enhanced Storage Device".

This technique can also be applied to a moving subject. For example, consider a photographer interested in capturing a "burst" sequence of a sporting event, such as a diving competition. The photographer can capture an image containing the background (i.e., no diver), and then a "burst" sequence of images of the diver during the dive. In this case, there will be many "first images" 102 ("Subject plus background" frames; the images of the dive in our example), and one second image 116 ("Background only" frame; the background image with no diver in our example). In this embodiment, a camera such as described in FIG. 7A is driven to capture a motion sequence of first images 102, which are stored in a suitably enlarged buffer 602 until processed by the DSP 604 and tagged, e.g., to indicate the position of each image in the sequence. The first images 102 are stored in the memory card 614 along with a second image 110. (This embodiment may also be practiced with the tethered camera shown in FIG. 3A). In the computer 202, an aligned digital image 116 is created corresponding to each first digital image 102 by an alignment process such as described in FIG. 4. A foreground mask image 120 is created for each first digital image 102 by subtracting the corresponding aligned digital image 116 from the first digital image 102 and processing the results as described in FIGS. 2, 5, and 6. Alternately, the foreground mask 120 can be created for only an initial frame, or a number of "key" frames, and the mask for the other frames of the sequence can be calculated using well-known motion tracking algorithms.

Figure 8A:
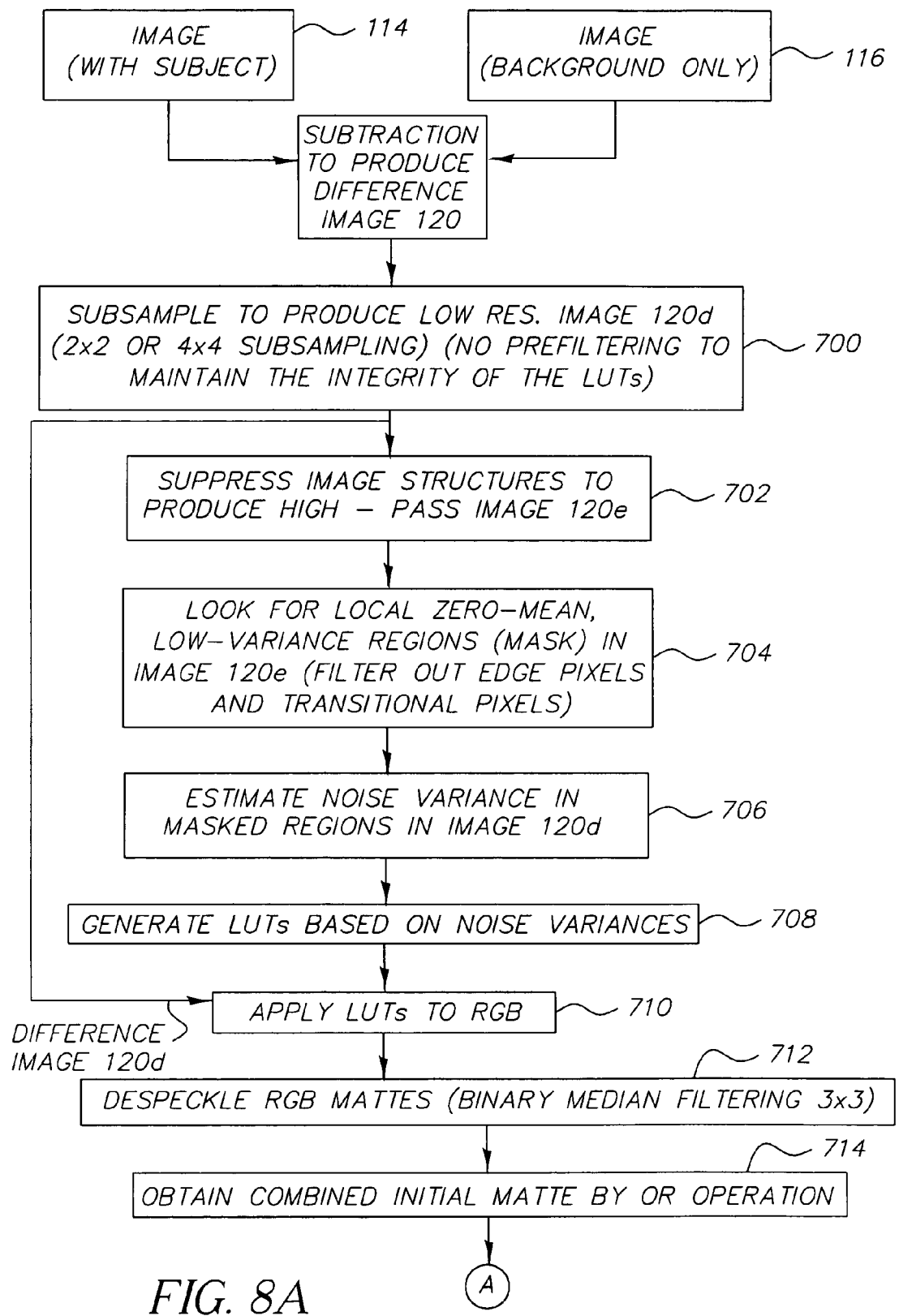
FIGS. 8A and 8B show further details of foreground mask generation, including a preferred technique known in the prior art for generating a set of lookup table thresholds based on noise estimation; and, FIG. 9 shows a digital camera useful in an embodiment of the present invention.
Figure 8B:
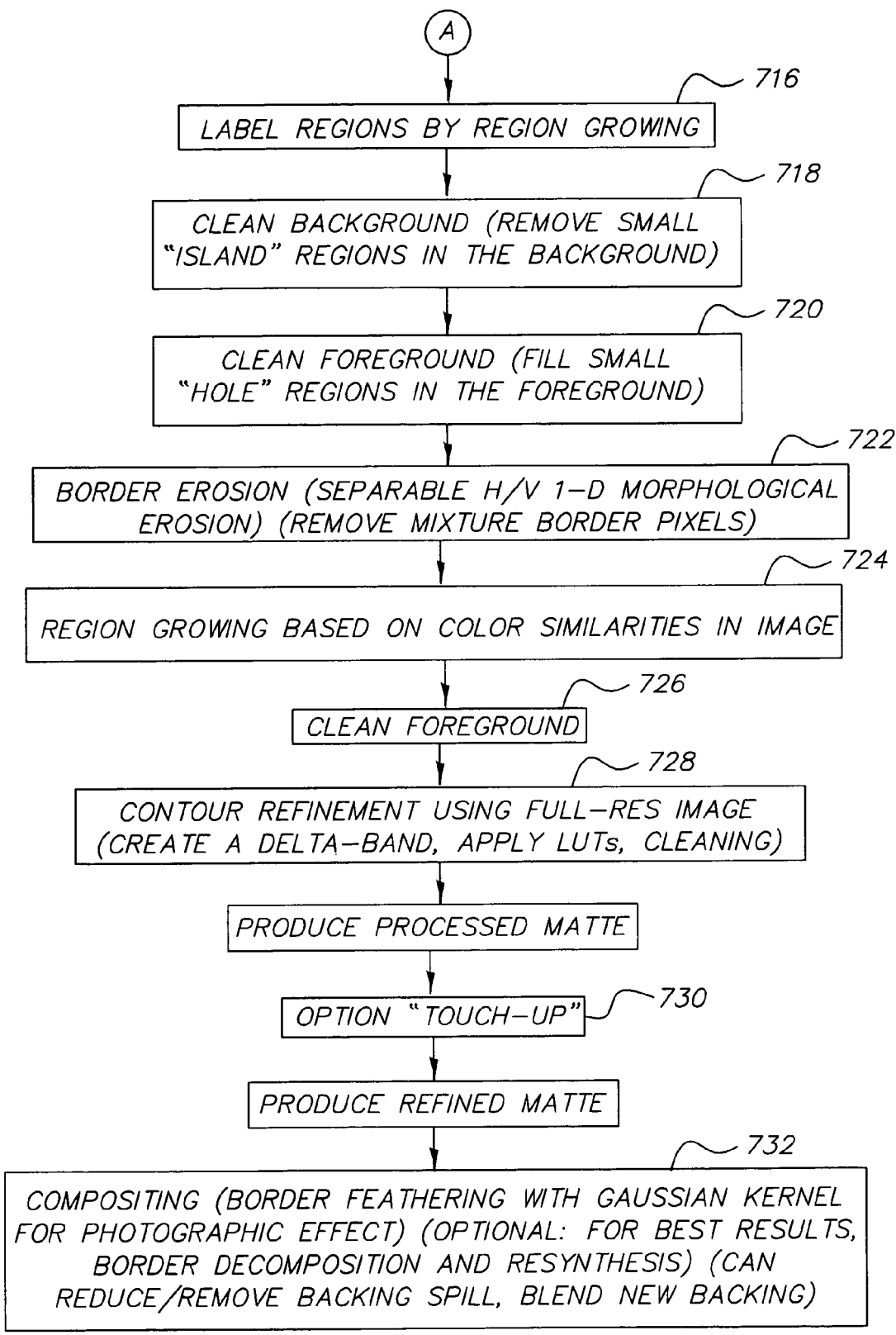

FIGS. 8A and 8B, which are similar to FIGS. 6A and 6B in the aforementioned '748 patent, show a currently preferred technique for generating a set of lookup table thresholds based on noise estimation (i.e., the threshold estimation section 406 shown in FIG. 5) and generating a refined foreground matte image by use of the lookup tables and additional techniques. Referring to steps in FIGS. 8A and 8B, the size of each difference image produced in the differencing section 400 (FIG. 5) or the separate differencing sections 400R, 400G, and 400B (FIG. 6) is reduced to an image 120d by subsampling without prefiltering (process 700) to reduce the subsequent computation, and the remaining image structure is suppressed by using a smoothing kernel 702 to produce a high pass image 120e. Edge pixels and transitional pixels (high variance regions) are filtered out of the image 120e by finding local zero-mean, low-variance regions 704 and the noise variance in these low variance (masked) regions of the difference image 120d is then estimated 706.

Based on the estimated noise variance in each color layer, the individual thresholds for RGB (i.e., for the threshold diagrams 404R, 404G, and 404B in FIG. 6) are set and the LUTs are generated 708. In practice, the thresholds are proportional to the magnitude of the noise variance, that is, a high variance indicates a higher threshold, and vice versa. At this point, the LUTs 402R, 402G, and 402B are applied 710 to the RGB difference images and the difference images are median filtered 712 as shown in FIG. 6. The initial matte is generated by binarization in an OR operation 714. Then, small regions are deleted 718 and small holes are filled 720. This is done in a region growing step 716, which identifies any connected regions in the binary image. Basically, if small "island" regions with non-zero values are found floating in the background, they are changed to zero 718. If small regions with zero values are found in the foreground, they are set high (255) in step 720. In the boundary region between the foreground and the background, pixels are eroded (removed) 722, essentially by cutting away a narrow strip of pixels, because they may be a mixture of foreground and background. Some pixels within this strip, however, are not mixtures; these pixels are distinguished by color similarities in the RGB images 102R, 102G, and 102B and these areas are grown back 724. This step also helps in filling some holes due to lack of color differences in the difference image 120.

After border erosion treatment 722 and region growing based on color similarities 724, small holes may reappear and the foreground is again cleaned 726 by repeating the steps 716–720.

Up to this point, the processing has been of the low resolution mask created in step 700. In now converting back to a high resolution mask, ambiguities can develop in the boundary regions between foreground and background. These contour areas are refined using the full resolution image 102 and image 116 (step 728) by generating a band of boundary pixels (delta-band), applying the LUTs from the step 708 to the pixels in the delta-band, and then cleaning the region in the delta-band with a median filter. If necessary, a refined matte is then obtained by optional "touch-up" cleaning 730 using, e.g., a manual "touch-up" procedure from Adobe Photoshop™. The refined matte is then ready for compositing. (Additional border feathering and border decomposition and resynthesis can be applied 732 to enhance border effects).

Figure 9:
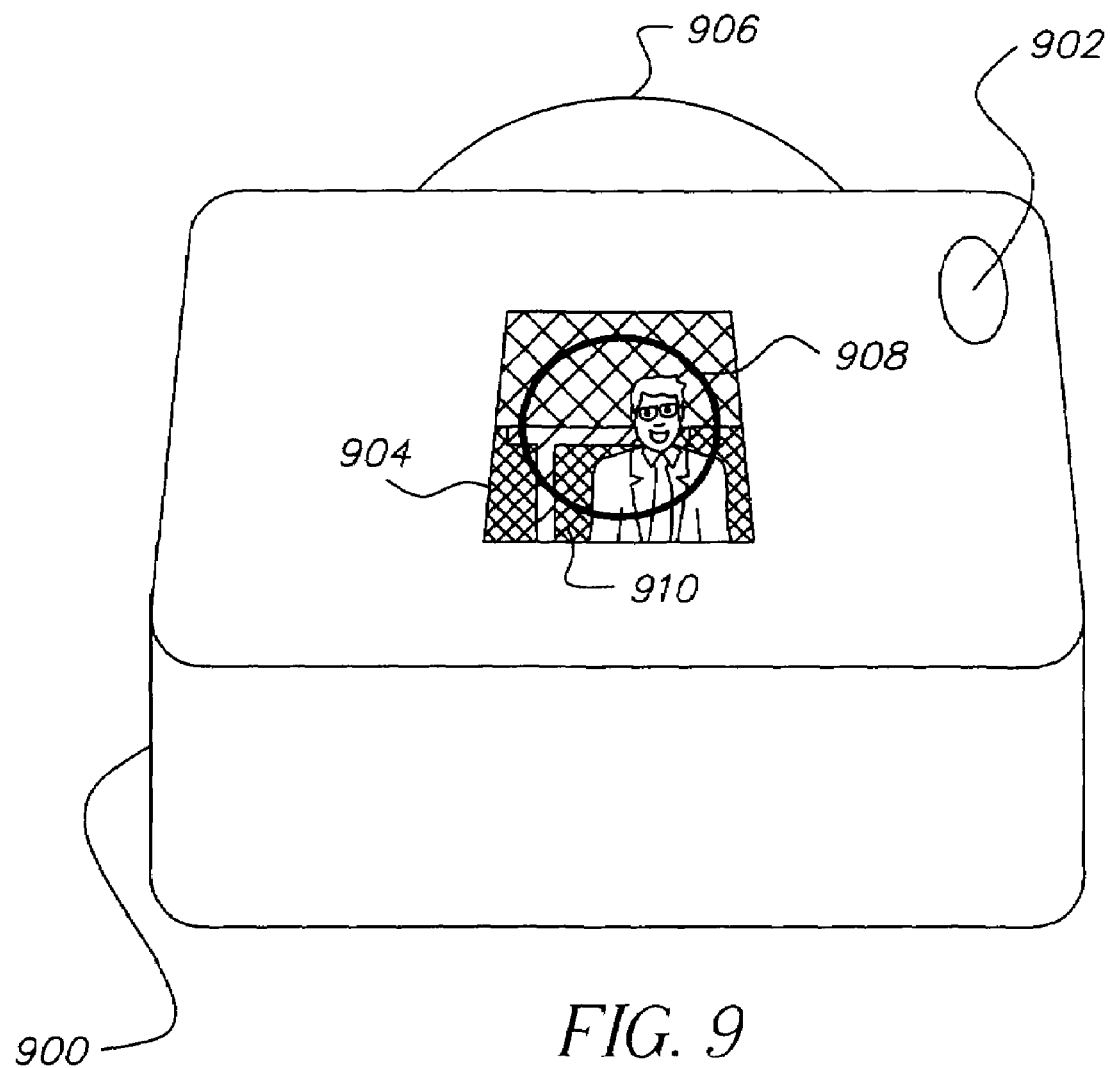

In one embodiment of the present invention, the stage 10 of receiving the digital images uses a digital camera that allows the photographer to provide a coarse alignment of the first and second digital images. FIG. 9 shows a camera incorporating an image compositing device in accordance with the present invention. The digital camera shown in FIG. 9 has a camera body 900, a capture button 902, a display device 904, and a lens 906 for focusing an image. In this embodiment, the display 904 is used as a view finder, and is divided into a first zone 908 and second zone 910, respectively. The first digital image 102 of the subject plus background is captured and the portion of the first digital image 102 corresponding to the first zone 908 is displayed in the first zone 908 of the display 904. A portion of a live image corresponding to the second zone 910 is displayed in the second zone 910 of the display 904. The photographer positions the camera until the live image shown in the second zone 910 is in coarse alignment with the first digital image shown in the first zone 908. Once a coarse alignment exists, the photographer presses the capture button 902 and captures the second digital image 110 of background only. This coarse alignment of the live image with the first digital image 102 ensures an overlapping relationship of image content and results in improved overall compositing performance. This embodiment has the advantage of ensuring that the first and second digital images are captured from substantially similar viewpoints, without requiring the use of a tripod or other stabilization device. This will help the photographer avoid the aforementioned situations where occlusions present in one image and absent from another have the potential of complicating the compositing process.

A digital camera that performs a similar function of providing a display capable of displaying portions of two images is described in International Patent Application No. WO 98/25402, which was published Jun. 11, 1988 and entitled "A Method and System for Assisting in the Manual Capture of Overlapping Images for Composite Image Generation in a Digital Camera", and also in U.S. Pat. No. 5,138,460, entitled "Apparatus for Forming Composite Images". These cameras are described in terms of their use in a system for generating panoramic images, where the camera is usually rotated about a common nodal point between subsequent image captures. In the context of these disclosures, it is desirable that the zones be predominantly located on either the left or right portion of the display (as indicated in FIGS. 8, 9A and 9B of the patent application) or capable of being scrolled both up and down and/or left and right (as indicated in FIGS. 14–16 of the '460 patent). In the context of the present invention, the zones should be chosen so that the subject captured in the first digital image will likely fall in the first zone, and the background will likely fall in the second zone. Therefore, a zone structure such as that indicated in FIG. 9 is used, where the first zone 908 is located in the center of the display 904, and the second zone 910 is located at the periphery of the display 904. Alternatively, one of a plurality of zone templates may be chosen by the photographer.

In an alternative embodiment of the invention, the utilization of the zones 908 and 910 could be reversed such that the first digital image 102 of the subject plus background is captured, and the portion of the first digital image 102 corresponding to the second zone 910 is displayed in the periphery of the display 904. Then, a portion of a live background image is displayed in the first zone 908 displayed in the center of the display 904. In this way, a user lines up a live "background" image in the center zone with a frozen background portion of the first image in the peripheral zone. In another embodiment, it may prove desirable to overlap certain portions of the first and second images in the display 904 to enhance the match up process. In this way, not only the zone borders but all or a portion of the second peripheral zone 910 can be used to help with the match. For instance, the second zone 910 located at the periphery could be a combination (e.g., 50/50) of the saved and frozen first digital image 102 and the live image. This could be accomplished by having the DSP 604 combine the stored first digital image 102 and the live image pixels values from buffer 602 to generate image pixel values equal to ($1^{st}$ image+$2^{nd}$ image)/2 in the outer zone 910, or a portion of the outer zone, and equal to just the live image in the center zone 908.

Referring to the image processing compositing step 126 shown in FIG. 2, it is also possible to position the image scene content of the foreground image 104 selectively within the composited image 128. For example, the digital camera shown in FIG. 9 can display the composited image 128 on the display device 904. The user can then view the composited image 128 and activate a positioning button (not shown). Such a positioning button can provide the user the means to position the foreground image 104 horizontally and vertically within the composited image 128. Pressing the positioning button on the left side indicates that the user desires the foreground image 104 to be positioned horizontally more to the left. The composite image 128 is then recalculated from the foreground image 104 and the selected background image. Corresponding indications are derived when the user presses the positioning button on the right, up, and down sides.

The user can also activate a zoom button (not shown) that can provide the user the means to change the relative size of the foreground image 104. Pressing the zoom button on one side can provide the user the means to indicate that the foreground image 104 should be made larger. Pressing the zoom button on the opposite side can indicate that the foreground image 104 should be made smaller. When the zoom button is activated, indicating a larger or smaller desired size, the foreground image 104 is then interpolated to the corresponding size and the composite image 128 is recalculated and displayed.

The invention has been described with reference to a preferred embodiment. However, it will be appreciated that variations and modifications can be effected by a person of ordinary skill in the art without departing from the scope of the invention. For example, in all of the embodiments described, a number of instances of the second (background) image 110 may be captured and averaged in order to reduce the noise that is present in electronically captured images. Furthermore, while FIG. 2 shows that a new background is selected 122 from a group of stored background images is input to the compositing step 126, the invention may be applied to the reprocessing of the foreground 104 and its recompositing into the original background (or vice versa). For example, if the foreground 104 is underexposed relative to the background, the foreground is extracted according to the invention and processed to "improve" its appearance. Then the processed foreground is returned to the original background. Conversely, the original background may be processed and recomposited with the original foreground.

PARTS LIST

| | |
|---|---|
| 10 | receiving stage |
| 12 | aligning stage |
| 14 | producing subject mask stage |
| 100 | capture step |
| 102 | first image |
| 104 | foreground image |
| 106 | subject removal step |
| 108 | capture step |
| 110 | second image |
| 112 | alignment step |
| 116 | aligned digital image |
| 118 | foreground mask generation step |
| 120 | foreground mask |
| 122 | background selection step |
| 124 | new background |
| 126 | compositing step |
| 128 | composite image |
| 200 | tethered digital camera |
| 202 | host computer |
| 204 | interface cable |
| 206 | lens |
| 208 | image sensor |
| 210 | A/D converter |
| 212 | interface electronics section |
| 214 | control electronics section |
| 216 | keyboard |
| 218 | mouse |
| 220 | monitor |
| 300 | point selection step |
| 302 | neighborhood similarity measure step |
| 304 | homography estimation step |
| 306 | geometric transformation step |
| 400 | differencing section |
| 400R | red differencing section |
| 400G | green differencing section |
| 400B | blue differencing section |
| 402 | LUT section |
| 402R | red LUT |
| 402G | green LUT |
| 402B | blue LUT |
| 404 | threshold diagram |
| 404R | threshold diagram |
| 404G | threshold diagram |
| 404B | threshold diagram |
| 406 | threshold estimation section |
| 408 | median filter section |
| 410 | user section |
| 412 | tool |
| 414 | new background (hole) |

-continued
PARTS LIST

| | |
|---|---|
| 500 | correlation section |
| 600 | digital camera with memory |
| 602 | buffer memory |
| 604 | DSP |
| 606 | user input controls |
| 608 | tags |
| 610 | status LCD |
| 612 | capture button |
| 614 | memory card |
| 615 | arrow |
| 616 | memory card slot |
| 618 | memory card slot |
| 700–732 | steps |
| 900 | camera body |
| 902 | capture button |
| 904 | display |
| 906 | lens |
| 908 | first zone |
| 910 | second zone |

What is claimed is:

1. A method for producing a foreground mask from a digital image, said method comprising the steps of:

a) receiving two digital images, each having a plurality of pixels, wherein a first digital image is derived from a first original scene image including a foreground photographed against a background having arbitrary and unknown content matter, and a second digital image is derived from a second original scene image including substantially the same background but without the foreground;

b) automatically aligning the second digital image to the first digital image to generate an aligned digital image including the background without the foreground, wherein the automatic aligning is achieved without user intervention; and c) using the first digital image and the aligned digital image to produce a foreground mask relating to an area in the first digital image pertaining to the foreground, whereby the foreground mask is subsequently used to generate a composite digital image.

2. The method of claim 1, wherein the step (c) of using the first digital image and aligned digital image to produce a foreground mask comprises the steps of:

i) subtracting the aligned digital image from the first digital image to generate a difference image;

ii) processing the difference image to generate a mask image;

iii) applying the mask image to the first digital image to select an area in which the foreground is located, whereby the selected foreground area is used in the compositing of a new image with a different background.

3. The method of claim 2, wherein the first and second digital images have been captured with a digital camera that includes a display device and further including the steps of:

d) displaying the composite digital image on the display device;

e) selecting a different position for the foreground area within composite digital image; and;

f) producing a new composite image responsive to the selected different position.

4. The method of claim 2, wherein the first and second digital images have been captured with a digital camera that includes a display device and further including the steps of:

d) displaying the composite digital image on the display device;

e) selecting a different size for the foreground area relative to the size of the composite digital image; and;

f) producing a new composite image responsive to the selected different size.

5. The method of claim 1, wherein the step (a) of receiving two digital images comprises the steps of:
   i) capturing and displaying the first digital image;
   ii) displaying and, with user intervention, coarsely aligning a live image with the first digital image; and
   iii) capturing the live image to yield the second digital image; wherein the second digital image is coarsely adjusted by the user to include substantially the same background matter without the subject.

6. The method of claim 1, wherein the step (a) of receiving the two digital images comprises the steps of:
   i) initiating a composite image capture process in a digital camera by capturing and storing the first digital image and displaying a portion of the first digital image that is intended to overlap with the second digital image; and
   ii) displaying a live image in an overlapping relationship with the first digital image to enable a user to coarsely align the live image with the first digital image before capturing the live image as the second digital image.

7. A method for producing a subject mask from a digital image for use in a compositing process, said method comprising the steps of:
   a) receiving two digital images, each having a plurality of pixels, wherein a first digital image is derived from a first original scene image including a subject photographed against a background having arbitrary and unknown content matter, and a second digital image is derived from a second original scene image including substantially the same background matter without the subject; and,
   b) automatically processing the second digital image in relation to the first digital image to generate an aligned digital image including the background matter without the subject, wherein the automatic processing is achieved through a homographic transformation without user intervention; and,
   c) using the first digital image and the aligned digital image to produce a subject mask relating to an area in the first digital image pertaining to the subject, whereby the subject mask is used to generate a composite digital image.

8. The method as claimed in claim 7 wherein the step b) of automatically aligning the second digital image to the first digital image comprises the steps of:
   i) choosing a set of points in the first digital image and locating their corresponding points in the second digital image using a similarity measure, thereby generating a collection of points;
   ii) for each prospective point in the collection, selecting a matching point in the second digital image based on a neighborhood similarity measure evaluated within an area centered on the prospective point in the collection, thereby generating a collection of matching points representing a set of putative correspondences;
   iii) using the collection of matching points, estimating the homography between the background matter of the first and second digital images; and
   iv) transforming the second digital image according to the estimated homography to align it with the first digital image.

9. The method of claim 7, wherein the step (c) of using the first digital image and aligned digital image to produce a subject mask comprises the steps of:
   i) subtracting the aligned digital image from the first digital image to generate a difference image;
   ii) processing the difference image to generate a mask image;
   iii) applying the mask image to the first digital image to select an area in which the subject is located, whereby the selected subject area is used in the compositing of a new image with a different background.

10. The method of claim 7, wherein the step (a) of receiving two digital images comprises the steps of:
   i) capturing and displaying the first digital image;
   ii) displaying and, with user intervention, coarsely aligning a live image with the first digital image; and
   iii) capturing the live image to yield the second digital image, wherein the second digital image is coarsely adjusted by the user to include substantially the same background matter without the subject.

11. The method of claim 7, wherein the step (a) of receiving the two digital images comprises the steps of:
   i) initiating a composite image capture process in a digital camera by capturing and storing the first digital image and displaying a portion of the first digital image that is intended to overlap with the second digital image; and
   ii) displaying a live image in an overlapping relationship with the first digital image to enable a user to coarsely align the live image with the first digital image before capturing the live image as the second digital image.

12. A system for producing a foreground mask from a digital image, said system comprising:
   a digital camera for capturing two digital images, each having a plurality of pixels, wherein a first digital image is obtained from a first original scene image including a foreground photographed against a background having arbitrary and unknown content matter, and a second digital image is obtained from a second original scene image including substantially the same background but without the foreground; and
   a processor for (a) automatically aligning the second digital image to the first digital image to generate an aligned digital image including the background without the foreground, wherein the automatic aligning is achieved without user intervention; and (b) using the first digital image and the aligned digital image to produce a foreground mask relating to an area in the first digital image pertaining to the foreground, whereby the foreground mask is subsequently used to generate a composite digital image.

13. The system of claim 12, wherein the processor subtracts the aligned digital image from the first digital image to generate a difference image, processes the difference image to generate a mask image, and applies the mask image to the first digital image to select an area in which the foreground is located, whereby the selected foreground area is used in the compositing of a new image with a different background.

14. The system of claim 12, wherein the camera includes a view finder for displaying the digital images and a camera processor coupled to the view finder for (a) enabling a display on the view finder of a portion of the first digital image that is to overlap with the second digital image and (b) enabling display of a live image in an overlapping relationship with the first digital image on the view finder to enable a user to coarsely align the live image with the first digital image before capturing the live image as the second digital image.

15. The system as claimed in claim 12 wherein the processor includes an alignment algorithm for performing a homographic transformation, said algorithm:
   a) choosing a set of points in the first digital image and locating their corresponding points in the second digital image using a similarity measure, thereby generating a collection of points;
   b) for each prospective point in the collection, selecting a matching point in the second digital image based on a neighborhood similarity measure evaluated within an area centered on the prospective point in the collection, thereby generating a collection of matching points representing a set of putative correspondences;
   c) using the collection of matching points, estimating the homography between the background matter of the first and second digital images; and
   d) transforming the second digital image according to the estimated homography to align it with the first digital image.

16. A digital camera for capturing images that are subsequently useful in a compositing process, said camera comprising:
   an imaging device for capturing image data;
   a memory for storing the image data from the imaging device;
   a digital processing section coupled to the imaging device and the memory to enable the capture and storage of a first digital image including a subject photographed against a background;
   an electronic view finder coupled to the digital processing section for displaying a portion of the first digital image in a first display zone on the view finder; and
   said digital processing section enabling the capture and display on the view finder of a second digital image including substantially the same background, but without the subject, in an overlapping relationship with the displayed portion of the first digital image, whereby the second digital image is displayed as a live image in a second display zone on the viewfinder to enable a user to coarsely align the live image with the first digital image before capturing the live image as the second digital image, thereby ensuring that the two images are captured from substantially the same viewpoint.

17. The camera claimed in claim 16 wherein the second display zone surrounds the first display zone in the view finder of the camera.

18. The camera claimed in claim 17 wherein the first display zone displays the subject substantially in the center of a display provided by the view finder and the second display zone is substantially around the periphery of the display, whereby the border separating the two zones generally separates the subject from the background for many typical capture situations.

19. The camera claimed in claim 16 wherein the first display zone surrounds the second display zone in the viewfinder of the camera.

20. The camera claimed in claim 16 wherein the first display zone displays the background portion of the first digital image substantially around the periphery of the display and the second display zone displays the background substantially in the center of the display, whereby the border separating the two zones generally separates the periphery of the saved background from the live central portion of the background.

21. The camera claimed in claim 16 wherein the first and second digital images are overlapped and combined at least in part in a display provided by the viewfinder in order to assist in coarse alignment of the live image with the first digital image.

* * * * *

UNITED STATES PATENT AND TRADEMARK OFFICE
CERTIFICATE OF CORRECTION

PATENT NO.         : 7,024,054 B2                                         Page 1 of 1
APPLICATION NO. : 10/256900
DATED              : April 4, 2006
INVENTOR(S)        : Nathan D. Cahill et al.

It is certified that error appears in the above-identified patent and that said Letters Patent is hereby corrected as shown below:

Claim 20, Column 20, Line 23
Replace "in claim 16" with --in claim 19--

Signed and Sealed this

First Day of August, 2006

JON W. DUDAS
*Director of the United States Patent and Trademark Office*